(12) United States Patent
Gruss et al.

(10) Patent No.: US 11,131,338 B2
(45) Date of Patent: Sep. 28, 2021

(54) CONNECTION DEVICE

(71) Applicant: PHOENIX FEINBAU GMBH & CO. KG, Lüdenscheid (DE)

(72) Inventors: Dominic Gruss, Herdecke (DE); Thorsten Nolda, Herscheid (DE)

(73) Assignee: PHOENIX FEINBAU GMBH & CO. KG, Lüdenscheid (DE)

( * ) Notice: Subject to any disclaimer, the term of this patent is extended or adjusted under 35 U.S.C. 154(b) by 427 days.

(21) Appl. No.: 16/313,478

(22) PCT Filed: Jul. 4, 2017

(86) PCT No.: PCT/EP2017/066617
§ 371 (c)(1),
(2) Date: Dec. 27, 2018

(87) PCT Pub. No.: WO2018/007374
PCT Pub. Date: Jan. 11, 2018

(65) Prior Publication Data
US 2019/0249713 A1 Aug. 15, 2019

(30) Foreign Application Priority Data
Jul. 4, 2016 (LU) ............................. 93139

(51) Int. Cl.
*F16C 11/06* (2006.01)
(52) U.S. Cl.
CPC .......... *F16C 11/0695* (2013.01); *F16C 11/06* (2013.01)
(58) Field of Classification Search
CPC ......... F16C 11/0695; F16C 11/06; F16D 3/16

USPC .......... 248/663, 481, 181.2, 188.31; 403/122
See application file for complete search history.

(56) References Cited

U.S. PATENT DOCUMENTS

| | | | |
|---|---|---|---|
| 3,512,375 A * | 5/1970 | Baio ...................... | F16D 3/16 464/106 |
| 4,704,043 A | 11/1987 | Hackman et al. | |
| 5,411,445 A | 5/1995 | Oda | |
| 5,613,792 A * | 3/1997 | Terada ................. | F16C 7/00 403/131 |
| 6,287,206 B1 * | 9/2001 | Stage .................... | F16D 3/16 464/119 |
| 8,550,431 B2 * | 10/2013 | Wisser ................. | F16K 5/0647 251/292 |
| 2006/0293108 A1 * | 12/2006 | Sun ...................... | B60N 2/309 464/162 |

(Continued)

FOREIGN PATENT DOCUMENTS

| | | |
|---|---|---|
| DE | 19833030 A1 | 1/1999 |
| DE | 20112773 U1 | 1/2002 |
| DE | 102012013568 A1 | 5/2014 |

*Primary Examiner* — Muhammad Ijaz
(74) *Attorney, Agent, or Firm* — David S. Safran; Roberts Calderon Safran & Cole, P.C.

(57) ABSTRACT

A coupling (1) for connecting a linear drive (2) to a linearly guided slide element (3) having a coupling center piece (4), a ball joint (5) and a sliding joint (6). The ball joint (5) and the sliding joint (6) are arranged on opposite sides of the coupling (1). The ball joint (5) has a joint head (7) and a joint head socket (8), and the sliding joint (6) has a joint head (9) and a joint head socket (10). The joint head socket (8) of the ball joint (5) and/or the joint head socket (10) of the sliding joint (6) has/have a socket space (11, 12) which is open, at least on one side, perpendicularly to the longitudinal axis (L) of the coupling (1).

12 Claims, 5 Drawing Sheets

(56) References Cited

U.S. PATENT DOCUMENTS

2015/0354624 A1\* 12/2015 Speicher ............ F16C 11/0695
74/89

\* cited by examiner

CONNECTION DEVICE

BACKGROUND OF THE INVENTION

Field of the Invention

The invention relates to a coupling for connection of a linear drive to a linearly guided slide element.

Description of the Related Art

To connect a permanently mounted linear drive to a linearly guided slide element, for example, a punching tool, couplings are used which corresponding to the drive direction are also called linear couplings. For exact positioning of the slide element an axially rigid coupling as free of play as possible is necessary between the linear drive and the slide element. Moreover, the coupling should be able to compensate both for an alignment error and also an offset which occurs perpendicularly to the direction of the linear motion between the drive and the output, i.e., the slide element, as free of torque bias as possible.

Practice discloses an axially play-free linear drive which on the drive side consists of a disk-shaped hub with a threaded journal and on the output side of a disk-shaped hub with an internal thread. The two coupling hubs are connected to one another via four flat compensating springs which are each located offset by 90° to one another. The compensation springs can compensate both for a lateral offset and also an alignment error between the drive and the output which is limited by the radial play between the two coupling hubs. The connection of this linear coupling to the drive and to the output takes place here both on the drive side and also on the output side via threaded joints so that mounting is relatively complex and a corresponding tool is necessary. Moreover movement of the linear drive or of the slide element in the direction of the linear movement is necessary for mounting of the linear coupling.

U.S. Pat. No. 4,704,043 A discloses a coupling for transmission of tensile or compressive forces which consists of a housing and two self-aligning bearings which are connected via the housing to one another. The ball elements of the self-aligning bearings are each supported in the housing via a track ring element which is screwed into the housing. By using two self-aligning bearings, misalignments between the two components which are connected to one another via the coupling can be compensated. In these couplings, however, mounting is also relatively complex due to the screwing of the track ring elements into the housing. In addition, lateral offset between the drive and output cannot be compensated with this coupling.

SUMMARY OF THE INVENTION

Therefore, the object of this invention is to provide an axially stiff coupling for connecting a linear drive to a linearly guided slide element which enables compensation of alignment error and of lateral offset between the drive side and the output side with mounting as simple as possible.

This object is achieved in the coupling in accordance with the invention in that the coupling has a coupling center piece, a ball joint and a prismatic joint, the ball joint and the prismatic joint being located on opposite sides of the coupling. Alignment errors can be compensated by the ball joint while compensation of a lateral offset is enabled by the prismatic joint.

The ball joint and the prismatic joint each have a joint head and a corresponding joint head socket, in the mounted state of the coupling one joint head at a time being supported in the assigned joint head socket. For simple mounting of the coupling or for simple connection of the coupling to the linear drive and the slide element, the socket space of the joint head socket of the ball joint and/or the socket space of the joint head socket of the prismatic joint is open on at least on one side perpendicular to the longitudinal axis of the coupling. Preferably, both the socket space of the joint head socket of the ball joint and also the socket space of the joint head socket of the prismatic joint are open to both sides so that the joint head of the ball joint or the joint head of the prismatic joint can be easily inserted into the respective joint head socket by a straight plugging motion transversely to the direction of the linear motion, i.e., transversely to the longitudinal axis of the coupling.

According to one advantageous configuration of the coupling in accordance with the invention the prismatic joint has two degrees of translational freedom perpendicular to the longitudinal axis of the coupling, i.e., perpendicular to the direction of linear motion. In this way it is possible to compensate for an offset between the slide element and the linear drive in both axes perpendicular to the direction of linear motion. According to another advantageous configuration, the ball joint has at least two degrees of rotational freedom, the axes of the compensation motion which is possible in this way both running perpendicular to the longitudinal axis of the coupling. This enables a pivoting motion for compensation of alignment errors both in the horizontal and also in the vertical plane.

According to another preferred configuration of the coupling in accordance with the invention, the ball joint and the prismatic joint are each, moreover, made such that they both also have a degree of rotational freedom around the longitudinal axis of the coupling. Due to this degree of rotational freedom, the coupling center piece can turn freely relative to the drive and to the output, i.e., relative to the linear drive and the slide element, around the axis of the linear movement so that simple mounting of the coupling center piece is possible independently of the alignment of the coupling center piece around the longitudinal axis.

There are various possibilities with respect to the specific structural configuration, both of the coupling center piece and also of the ball joint and of the prismatic joint. According to one preferred embodiment, the joint head socket of the ball joint and the joint head socket of the prismatic joint are both made in the coupling center piece, while the joint head of the ball joint and the joint head of the prismatic joint are each connected to a connecting journal or are made on one connecting journal. The coupling center piece on one side, then, has the joint head socket of the ball joint and on the other opposite side the joint head socket of the prismatic joint so that the coupling center piece can be easily slipped onto the joint heads of the ball joint and the prismatic joint by a linear plugging motion transversely to the longitudinal axis when the two joint heads are located with a corresponding distance to one another in the direction of linear motion. The two joint heads can be connected here by means of their connecting journal to the linear drive or to the slide element, for which the connecting journals can for example each both have a thread, in particular an external thread.

According to one alternative embodiment, the joint head of the ball joint and the joint head of the prismatic joint are made on the coupling center piece, while the joint head socket of the ball joint and the joint head socket of the prismatic joint are each connected to a connecting journal.

The arrangement of the elements of the two joints is then interchanged compared to the embodiment described above. Of course, it is also possible for a combination of the two above described versions to be implemented, for example, by the joint head socket of the ball joint and the joint head of the prismatic joint being made on the coupling center piece, while the joint head of the ball joint and the joint head socket of the prismatic joint each have a connecting journal or are connected to a connecting journal.

To implement the axially stiff linear coupling as free of play as possible, the fit between the joint head and the joint head socket of the ball joint is designed to be as free of play as possible. This prevents displacement between the joint head and the joint head socket in the direction of the longitudinal axis of the coupling, i.e., in the direction of linear movement, but enables compensation of alignment errors, i.e., of an angular offset. The fit between the joint head and the joint head socket of the prismatic joint is also designed to be preferably free of play in the direction of the longitudinal axis of the coupling. Perpendicular to the longitudinal axis of the coupling, The fit between the joint head and the joint head socket of the prismatic joint is conversely designed with play, as a result of which the compensation of lateral offset according to the magnitude of the play is possible.

Both the joint head of the ball joint and also the joint head of the prismatic joint can have different geometrical shapes. The joint head of the ball joint can be made in particular spherical or disk-shaped as long as the joint head together with the joint head socket enables the preferably two degrees of translational freedom. The joint head and the joint head socket of the prismatic joint are preferably each made T-shaped in the longitudinal section, the extension of the joint head socket perpendicular to the longitudinal axis of the coupling being greater than the corresponding extension of the joint head, i.e., the extension of the joint head perpendicular to the longitudinal axis. The play between the joint head and the joint head socket perpendicular to the longitudinal axis of the coupling is then determined by the corresponding difference in length between the joint head socket and the joint head perpendicular to the longitudinal axis of the coupling, this difference in length also establishing the greatest possible offset which can be compensated by the prismatic joint.

To prevent unintentional loosening of the coupling, in particular in operation by the simple mounting of the coupling with the linear drive, on the one hand, and the slide element, on the other, between the two elements at least one of the two joints, i.e., between the joint head and the joint head socket of the ball joint or of the prismatic joint, positive or non-positive locking or a bonded connection is made. Locking can be made in particular spring-loaded so that during mounting locking takes place automatically and in this way after mounting prevents unintentional loosening of the coupling. Intentional loosening of the coupling is, however, possible as before for corresponding spring-loaded locking. A bonded connection of the two elements of a joint can be implemented, for example, by the inner jacket surface of the socket or the outer surface of the joint head having a rubber coating. Finally, unintentional loosening of the coupling can also be prevented by the socket space of the joint head socket of the ball head and/or of the prismatic joint being at least partially closed by means of a corresponding cover so that the joint head cannot slide out of the corresponding socket space.

In particular, there are a host of possibilities for embodying and developing the coupling in accordance with the invention. For this purpose reference is made to the following description of exemplary embodiments in conjunction with the accompanying drawings.

DETAILED DESCRIPTION OF THE INVENTION

Figure 1:
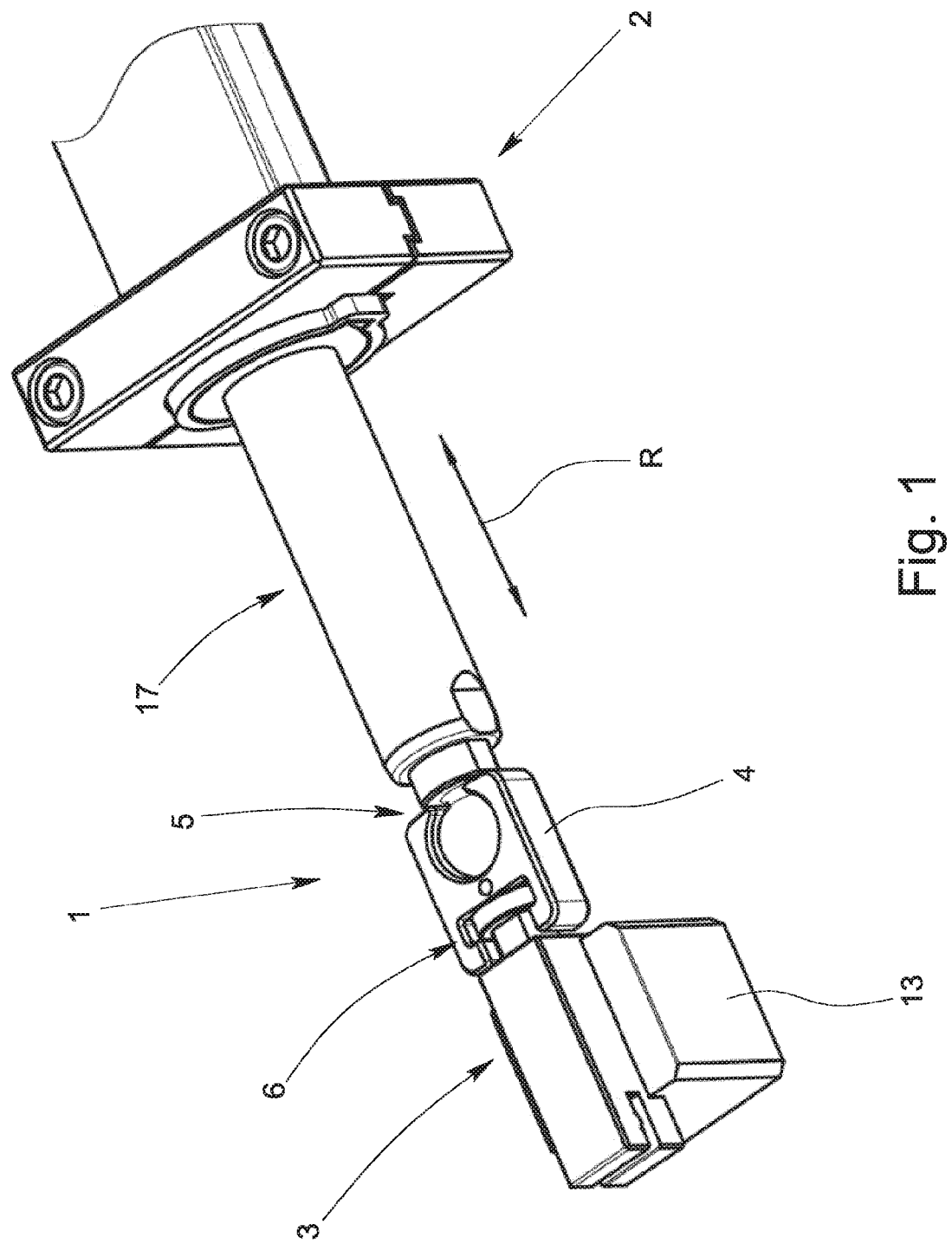
FIG. 1 is a perspective view of a coupling in accordance with the invention for connecting a linear drive to a linearly guided slide element.
Figure 3:
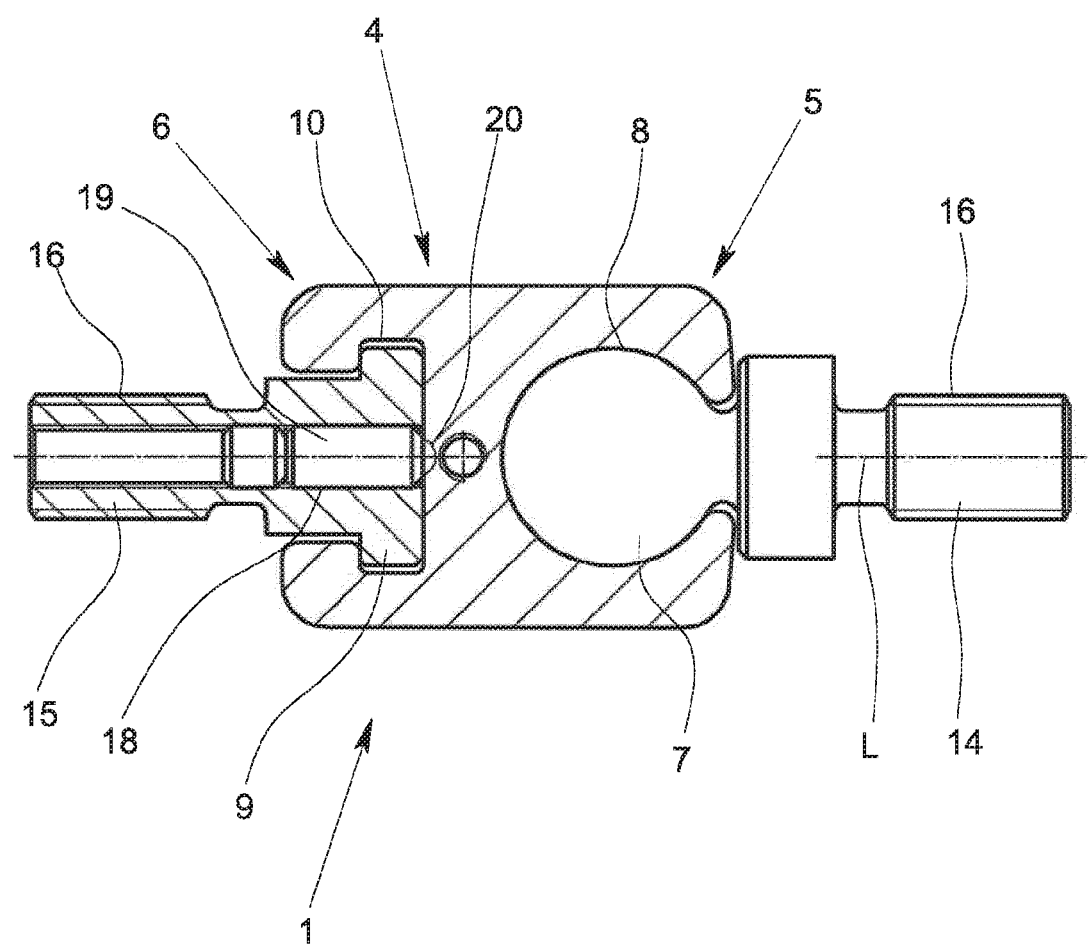
FIG. 3 is an enlarged partial cross-sectional view of the coupling according to FIGS. 1 and 2.
Figure 4:
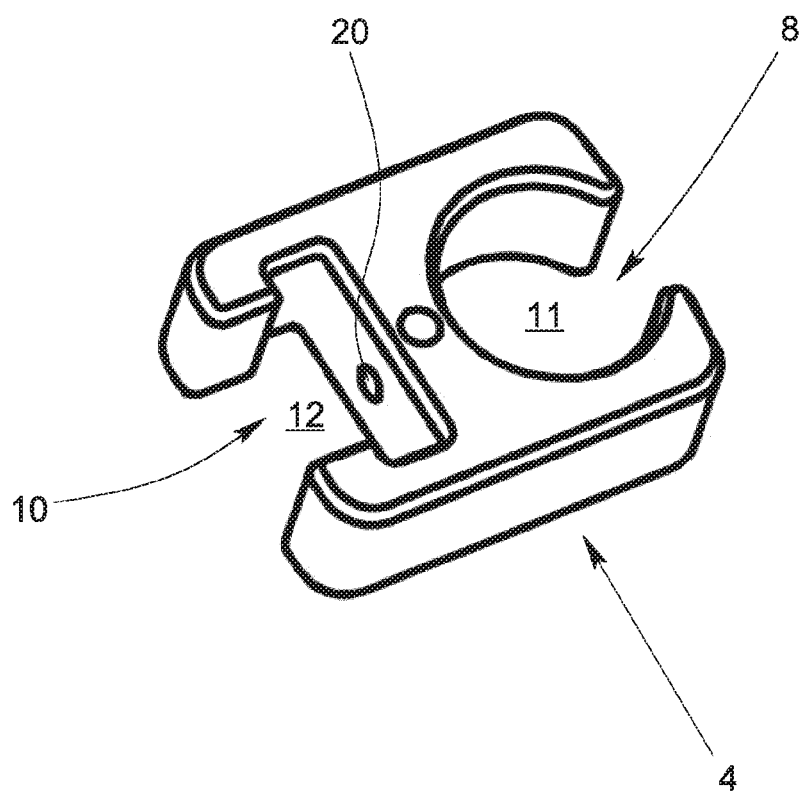
FIG. 4 is a perspective view of the coupling center piece of the coupling according to FIG. 3, and FIGS. 5a & 5b show an alternative embodiment of a coupling in accordance with the invention, in a plan view and in a perspective view, respectively.
Figure 5A:
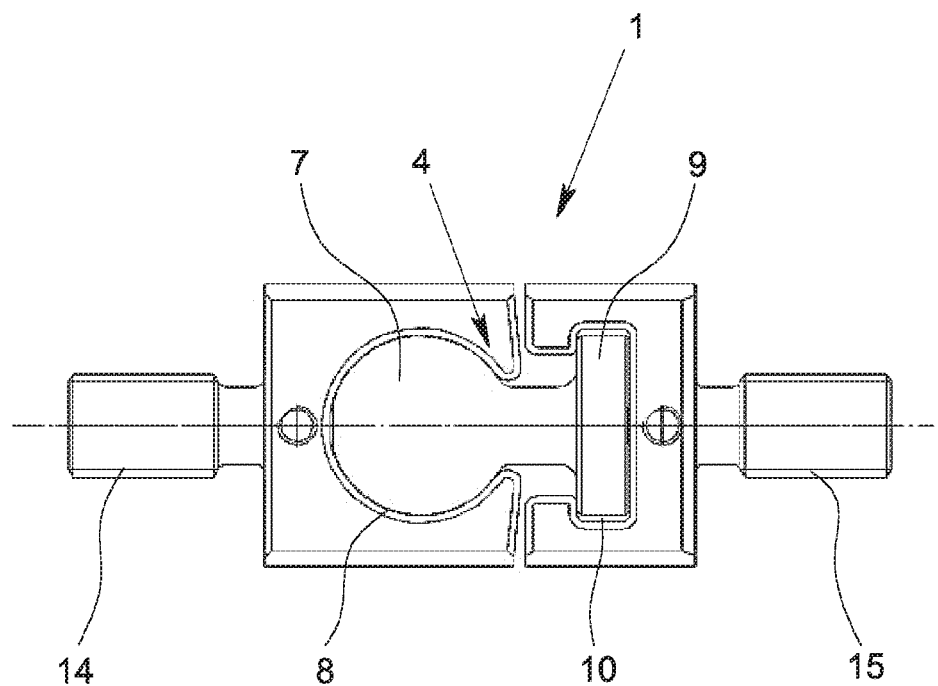
Figure 5B:
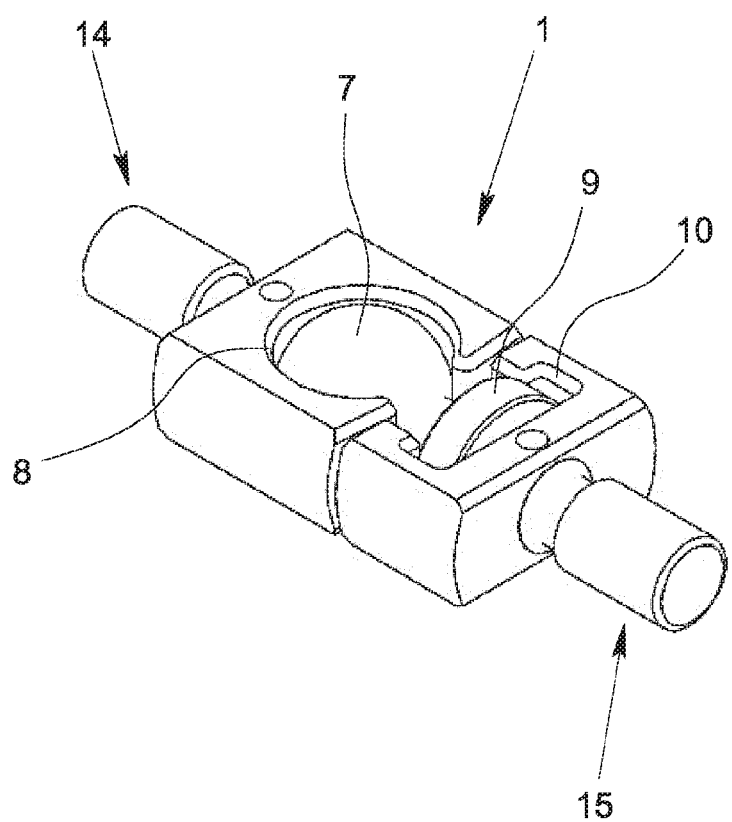

In the perspective view of FIG. 1, a coupling 1 for connecting a linear drive 2 to a linearly guided slide element 3 is shown. The coupling 1, which is shown separately in FIGS. 3, 5a and 5b, is comprised of a coupling center piece 4, a ball joint 5, and a prismatic joint 6, the ball joint 5 and the prismatic joint 6 being located on opposite sides of the coupling 1.

The ball joint 5 is comprised of a joint head 7 and a corresponding joint head socket 8. The prismatic joint 6 also has a joint head 9 and a corresponding joint head socket 10. The joint head socket 8 of the ball joint 5 and the joint head socket 10 of the prismatic joint 6 each have a socket space 11, 12 which is open on both sides perpendicular to the longitudinal axis L of the coupling 1. To join the joint head 5, the coupling center piece 4 thus need simply be pushed or slid onto the joint head 7 perpendicular to the direction of the linear motion R with the joint head socket 8. Accordingly, to join the prismatic joint 6, the joint head socket 10 must be slipped or pushed into the joint head 9. Alternatively, the ball joint 5 and the prismatic joint 6 can also be joined by a rotational movement of the coupling center piece 4 around the longitudinal axis L in which the respective joint head 7, 9 is likewise inserted into the assigned joint head socket 8, 10.

Figure 2:
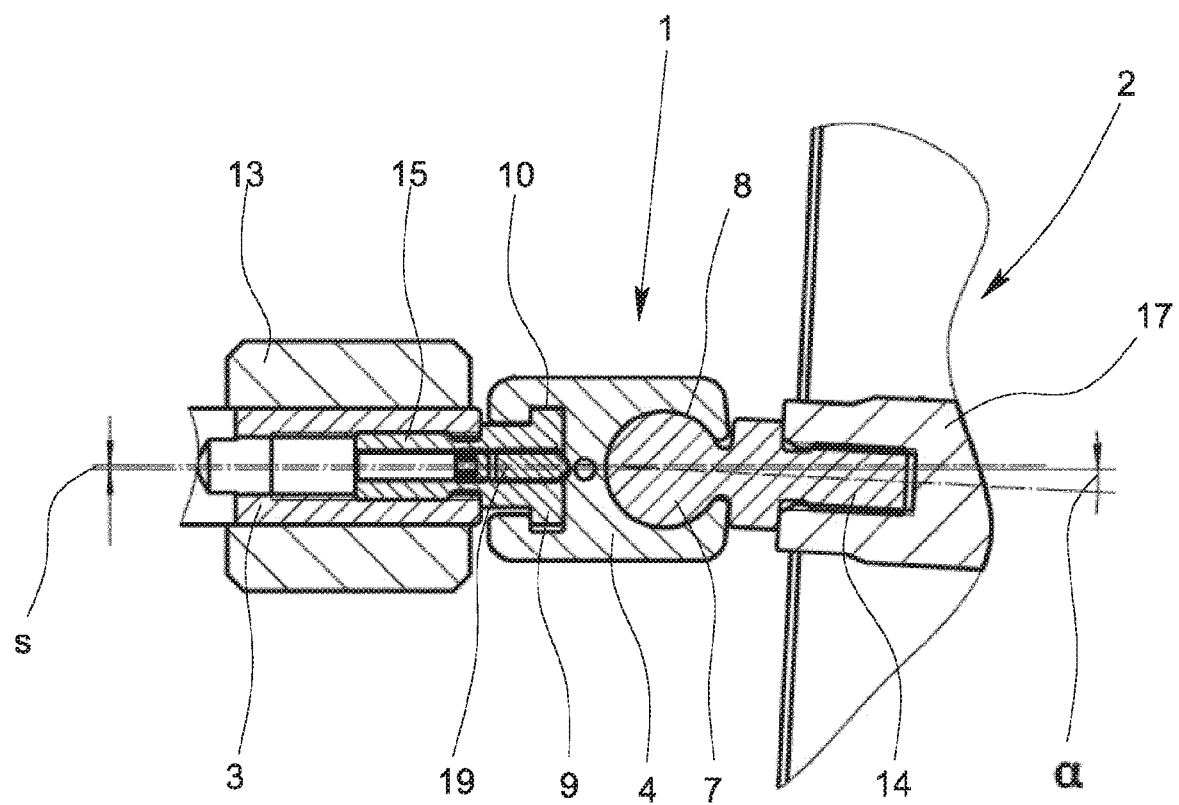
FIG. 2 is a cross-sectional view of the coupling for connecting a linear drive to a slide element according to FIG. 1.

FIG. 2 also shows how using the coupling 1 in accordance with the invention both an alignment error with an angle α and also an offset by a distance s between the linear drive 2 and the slide element 3 which is located in a guide 13 can be compensated. The compensation of the alignment error by the angle α takes place here by the ball joint 5 which has two degrees of rotational freedom so that a compensating pivoting motion is possible both in the direction shown in FIG. 2 and also perpendicular to the plane of the drawing. The compensation of a lateral offset by the distance s is enabled by the prismatic joint 6 that has a total of two degrees of translational freedom perpendicular to the longitudinal axis L of the coupling 1. Here, the axis of the second degree of freedom also extends perpendicular to the plane of the drawing.

In the configuration of the coupling 1 in accordance with the invention which is shown in FIGS. 1 to 4, the joint head sockets 8, 10 are both made in the coupling center piece 4 as corresponding grooves which are open on the face. The two joint heads 7, 9 each have a connecting journal 14, 15 which faces away from the coupling center piece 4, on the two connecting journals 14, 15, an external thread 16 being made via which the joint head 7 of the ball joint 5 with the connecting journal 14 can be screwed in the connecting rod 17 of the linear drive 2 and the joint head 9 of the prismatic joint 6 with the connecting journal 15 in the slide element 3. The coupling 1 thus is comprised essentially of three components, specifically the coupling center piece 4, the joint head 7 of the ball joint 5 with the connecting journal 14 and the joint head 9 of the prismatic joint 6 with the connecting journal 15.

The section according to FIG. 3, moreover, shows that the joint head 9 and the joint head socket 10 of the prismatic joint 6 are each made T-shaped in a longitudinal section. The extension of the joint head socket 10 perpendicular to the longitudinal axis L of the coupling 1 is somewhat greater here than the corresponding extension of the joint head 9 so that, perpendicular to the longitudinal axis L of the coupling 1, displacement between the joint head 9 and the joint head socket 10, and thus, compensation of an offset between the linear drive 2 and the slide element 3, are possible.

As shown in FIG. 3 and also in FIG. 1, the joint head 7 and the joint head socket 8 of the ball joint 5 are each made disk-shaped in a longitudinal section, the fit between the joint head 7 and the joint head socket 8 being designed to be free of play. Instead of the disc-shaped joint head 7 which is show in the figures, the ball joint 5 can also have a ball-shaped joint head, i.e., a joint ball which can then, depending on the thickness of the coupling center piece 4, protrude somewhat above the top and the bottom of the coupling center piece 4.

The section of the coupling 1 according to FIGS. 2 and 3, moreover, shows that, in a hole 18 in the joint head 9, there is an elastic thrust piece 19 formed as a spring element by which the play-free arrangement of the joint head 9 in the joint head socket 10 in the direction of the longitudinal axis L of the coupling 1 is ensured. Moreover, the elastic thrust piece 19 and a corresponding depression 20 made in the joint head socket 10 for this purpose implements positive and non-positive locking between the joint head 9 and the joint head socket 10 so that the joint head 9 is prevented from unintentionally sliding out of the joint head socket 10 perpendicular to the longitudinal axis L. Similar locking can also be formed between the joint head 7 and the joint head socket 8 of the ball joint 5. Alternatively, unintentional loosening of the coupling 1 can also be prevented, for example, by the socket space 11 of the joint head socket 8 being at least partially closed by means of a cover after inserting the joint head 7.

FIGS. 5a and 5b show an alternative configuration of the coupling 1, in a plan view (FIG. 5a) and in a perspective view (FIG. 5b). In this embodiment of the coupling, the joint head 7 of the ball joint 5 and the joint head 9 of the prismatic joint 6 are each made on the coupling center piece 4. The joint head socket 8 of the ball joint 5 and the joint head socket 10 of the prismatic joint 6 in this embodiment are then each connected to a connecting journal 14, 15 or are formed on one end of a connecting journal 14, 15.

The invention claimed is:

1. A coupling for connection of a linear drive to a linearly guided slide element, comprising:
    a coupling center piece,
    a ball joint and
    a prismatic joint,
    wherein the ball joint and the prismatic joint are located on opposite sides of the coupling center piece,
    wherein the ball joint has a joint head and a joint head socket,
    wherein the prismatic joint has a joint head and a joint head socket,
    wherein at least one of the joint head socket of the ball joint or the joint head socket of the prismatic joint has a socket space which is open on at least one side perpendicular to a longitudinal axis of the coupling, and
    wherein the prismatic joint has two translational degrees of freedom perpendicular to the longitudinal axis of the coupling.

2. The coupling as claimed in claim 1, wherein the ball joint has at least two degrees of rotational freedom around an axis perpendicular to the longitudinal axis of the coupling.

3. The coupling as claimed in claim 1, wherein the ball joint and the prismatic joint each have a degree of rotational freedom around the longitudinal axis of the coupling.

4. The coupling as claimed in claim 1, wherein the joint head socket of the ball joint and the joint head socket of the prismatic joint are both located in the coupling center piece, and wherein the joint head of the ball joint and the joint head of the prismatic joint are each connected to a respective journal.

5. The coupling as claimed in claim 4, wherein the respective connecting journals each have a thread for connecting to the linear drive or to the slide element.

6. The coupling as claimed in claim 1, wherein the joint head of the ball joint and the joint head of the prismatic joint are located in the coupling center piece, and wherein the joint head socket of the ball joint and the joint head socket of the prismatic joint are each connected to a connecting journal.

7. The coupling as claimed in claim 1, wherein the fit between the joint head and the joint head socket of the ball joint is free of play in a direction of the longitudinal axis.

8. The coupling as claimed in claim 1, wherein a fit between the joint head and the joint head socket of the prismatic joint is free of play in a direction of the longitudinal axis of the coupling and with play perpendicular the longitudinal axis of the coupling.

9. The coupling as claimed in claim 8, wherein the joint head and the joint head socket of the prismatic joint are each T-shaped in longitudinal section, an extension of the joint head socket perpendicular to the longitudinal axis of the coupling being greater than the extension of the joint head perpendicular to the longitudinal axis.

10. The coupling as claimed in claim 8, wherein a spring element provides said fit between the joint head and the joint head socket of the prismatic joint that is free of play in the direction of the longitudinal axis of the coupling using.

11. The coupling as claimed in claim 1, wherein a locking or bonded connection is provided between at least one of the joint head and the joint head socket of the ball joint or the joint head and the joint head socket of the prismatic joint.

12. The coupling as claimed in claim 1, wherein the socket space of at least one the joint head socket of the ball joint or the socket space of the joint head socket of the prismatic joint are least partially closed with a cover.

* * * * *